United States Patent Office 3,371,710
Patented Mar. 5, 1968

3,371,710
USE OF SURFACTANTS IN OIL RECOVERY
Robert R. Harvey and Thomas B. Reid, Bartlesville, Okla., assignors to Phillips Petroleum Company, a corporation of Delaware
No Drawing. Filed Mar. 25, 1965, Ser. No. 442,789
16 Claims. (Cl. 166—9)

ABSTRACT OF THE DISCLOSURE

Waterflooding of an oil reservoir using a slug of non-ionic surfactant dissolved in water is improved by controlling the ionic character of the reservoir environment, either reducing the monovalent ion content of the connate water which the slug contacts or incorporating multivalent ions in the aqueous slug of surfactant, or both, it having been found that monovalent ions such that $Na^+$, $K^+$, $Cl^-$, $OH^-$, etc. diminish the solubility of the surfactant and multivalent ions such as $Ca^{++}$, $Al^{+++}$, and $Ce^{+++}$ increase solubility thereof.

---

This invention relates to an improved process for producing oil from an oil-bearing stratum by water flooding utilizing surfactants.

In the production of oil by water flooding or aqueous drive, it has been found that various types of surfactants are effective in displacing the oil from the reservoir rock surfaces. One of the disadvantages of using surfactants in this type of operation is the avidity with which they are adsorbed by the rock surfaces. To illustrate, in a simulated reservoir system comprising unconsolidated oil-wet Burbank sand and Burbank reservoir fluids, the amount of surfactant solution approximately 10 times the pore volume was required before surfactant appeared at the production end of the sand. The incremental oil began to appear after a little more than 2 pore volumes had been injected and was produced at a high (~30:1) water-oil ratio. This slow production results chiefly from the low rate of advancement of the front of the adsorbed surfactant. Thus, the amount of surfactant required is high and the cost necessarily rises to uneconomic levels in many cases.

This invention is concerned with a process for increasing the utility of non-ionic surfactants in water flooding operations.

Accordingly, an object of the invention is to provide an improved water flooding or water drive process for recovering oil from an oil-bearing stratum utilizing non-ionic surfactants. Another object is to improve the economics of water flooding operations in which non-ionic surfactants are incorporated in the injected water. A further object is to provide an improved water flooding operation utilizing non-ionic surfactants which more efficiently utilizes the injected surfactant. Other objects of the invention will become apparent to one skilled in the art upon consideration of the accompanying disclosure.

A broad aspect of the invention comprises controlling the ionic character or environment of the reservoir or stratum into which a solution of surfactant is injected in advance of a water flood or drive so as to require a minimum of non-ionic surfactant in the operation. It has been found that the ionic environment in the oil-bearing stratum to which the water drive is applied has a controlling influence on the behavior and affect of the surfactant being driven thru the stratum. Many ions are commonly found in reservoir brine or connate water within a stratum and sometimes in the injected water. If these ions are monovalent ions, such as $Na^+$, $K^+$, $Cl^-$, $OH^-$, etc., the solubility of the surfactant is diminished and the equilibrium between surfactant adsorbed ⇌ surfactant dissolved is shifted in favor of adsorption with the resultant depletion of the surfactant in solution and reduction in the mobility of the surfactant front. On the other hand, the presence of multivalent ions in the environmental water, such as $Ca^{++}$, $Al^{+++}$, $Ce^{+++}$, $SO_4^=$, $PO_4^\equiv$, etc., has the opposite effect.

In accordance with the invention undesirable ions in the formation waters are eliminated or modified to create a favorable ionic environment to improve the mobility of the surfactant front. Several steps or combinations of steps are utilized as follows:

(1) If the formation water contains a relatively high concentration of monovalent ion, $Na^+$, $K^+$, $Cl^-$ (>1000 p.p.m.) a fresh water barrier slug precedes the injection of the surfactant flooding solution.
(2) The surfactant solution is fortified by the addition of 5 percent by weight of a salt of a multivalent cation such as $Ca^{++}$, for example $CaCl_2$ or $Al^{+++}$ as $Al_2(SO_4)_3 \cdot 6H_2O$ or $Ce^{+++}$ as $Ce_2(SO_4)_3 \cdot 8H_2O$ or compatible combinations of these, among others. Multivalent anions have a similar effect, particularly, acid radicals, and may be used.
(3) A combination of (1) and (2).
(4) If the concentration of deleterious ions is low (<1000 p.p.m.), only the fortified surfactant solution of (2) is used.
(5) A slug of 5 wt. percent solution of the fortifying compounds suggested under (2) is injected to properly condition the reservoir formation which is then followed by the surfactant solution, containing no fortifiers or a lesser concentration of these.

The change in ionic strength of the connate or stratum water in accordance with the invention is readily illustrated. Stratum brine is usually of about 0.5 mol concentration (NaCl). The ionic strength is about 0.5 as determined in the equation Ionic strength = $\frac{1}{2}(C_{Na} \times Z_{Na}^{+2} + C_{Cl}^- \times Z_{Cl}^{-2}) = \frac{1}{2}(0.5 \times 1^2 + 0.5 \times 1^2) = 0.5$ The treated slug containing an 0.5 mol concentration of the multivalent ions has an ionic concentration in the range of 1.5 to 7.5. This is demonstrated by substituting in the ionic strength formula for 0.5 mol concentration of $CaCl_2$.

Ionic strength = $\frac{1}{2}(C_{Ca}^{++} \times 2^2 + 2(C_{Cl}^- \times 1^2)) = 1.5$ This ionic strength of 1.5 is three times that of the in-place brine.

For a 0.5 mol concentration of $Al_2(SO_4)_3$ or $Ce_2(SO_4)$ the ionic strength is 7.5 or 15 times that of the in-place brine. This is determined by substituting in the generic formula $M_2R_3$ where M is a trivalent metal ion and R is a divalent acid radical, the ionic strength being $$\frac{1}{2}[2(C_M^{+3} \times 3^2) + 3(C_R^{-2} \times 2^2)] = 7.5$$

A change in ionic environment was readily accomplished by changing the concentration of the ions such as by diluting the solvent (water). Since a lower monovalent ion concentration is desired for improved effect on the surfactant, a slug of fresh water reduces the ionic strength of the monovalent ions by dilution. Since high ionic strength enhances sweep efficiency when utilizing a surfactant in the flood water, a soluble salt of di- or trivalent metals and/or di- or trivalent acid radicals incorporated in the injected aqueous slug is effective in increasing the ionic strength of the stratum environment. The concentration of these multivalent ions is regulated in the range of 0.25 to 1 mol (almost equivalent to 1 molar).

The surfactant can be either carried by the slug of ion carrying solution or it can follow the ion slug separately. Any driving fluid such as water, reclaimed water from previous water flooding; gases such as air, natural gas, combustion gas, steam, etc., can be used in the process.

The injected slugs will generally be in the range of 0.1 to 1.0 pore volume but may be in the broader range of 0.05 to 1.5 pore volumes. The surfactant concentration to be used is generally in the range of 0.001 to 10 weight percent and preferably in the range of 0.1 to 1 weight percent of the aqueous slug.

A number of non-ionic surface active agents or surfactants which are water soluble are readily available from commercial sources. Hydrophilic (or lyophilic) agents attracted to the water phase are most desirably employed. Exemplary non-ionic agents are those obtained by reaction of a hydrophobic hydroxy compound such as a phenol or alcohol with several moles of an alkylene oxide principally ethylene oxide or propylene oxide. Water solubility increases with the number of moles of the alkylene oxide reacted. Such products from oleyl alcohol, alkylated-β-naphthol, alkyl phenol such as nonylphenol, may be mentioned as exemplary. Similarly alkylene oxide (ethylene oxide) reaction products of higher fatty acids are well known as well as of fatty acid esters, including ethylene oxide reaction products of fatty acid esters of anhydrosorbitols. Lauric, palmitic, oleic, and stearic acids are commonly used for such esters which may generally be referred to as polyoxyalkylene derivatives of hexitol anhydride partial long chain fatty acid esters. The hexitol is usually sorbitol. Other non-ionic agents include phosphoric acid esters of polyethylene glycol; low order condensation products of alkylene oxide with esters of polyhydric alcohols and polybasic soluble acids, such as glycol tartrate and glycertol stearate further esterified with stearic acid; alkylene oxide condensation products of higher fatty acid reaction products with alkylolamines such as coconut fatty acids with diethanolamine, saponins; etc.

Not all non-ionic surfactants are equivalents in the process of the invention. It has been found that a number of non-ionic surfactants are considerably superior to others which have been carefully screened. These most effective compounds represent a common class of surfactants within special limitations as follows:

Certain polyethylene oxide ethers and thioethers listed below are commercially aviable and are especially effective in the process of the invention.

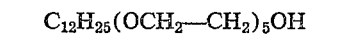

(Polyethylene oxide (4) lauryl ether)

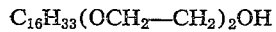

(Polyethylene oxide (2) cetyl ether)

(Tall oil polyethylene oxide (6) ether)

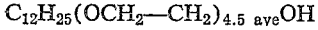

(Polyethylene oxide (4.5) lauryl ether)

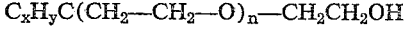

(Polyethylene oxide thioether)

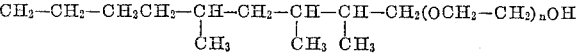

(2,3,5-trimethylnonyl polyethylene oxide ether)

To demonstrate the effectiveness of the treatment of surfactant solution with ions, a series of runs were made using Igepal CO-530, a nonylphenoxypoly(ethyleneoxy) ethanol (General Aniline Film and Chemical Corp.) as the nonionic surfactant. The apparatus utilized a 1″ diameter stainless steel tube 5′ in length packed with Burbank sand. The sand was packed so as to provide 38–39 percent porosity and 1.2 darcy permeability. The pack was then reconstituted with simulated connate water and Burbank crude oil to an oil-water ratio greater than 100:1. After the pack was flooded with simulated produced water to a water-oil ratio above 100:1, the surfactant flood was initiated.

The surfactant flood consisted of continuous injection of surfactant in aqueous solution until the oil had reached an irreducible saturation and the concentration of the surfactant in the effluent was equal to that in the injected solution. Continuous injection was chosen, rather than a slug of a finite size because no previous tests had determined exactly the amount of surfactant that the sand pack would retain. This retention was easily determined when continuous injection was used by noting the volume of surfactant injected when the surfactant broke through in the discharge line.

The data obtained in the runs are set forth in the table below:

TABLE.—EFFECT OF METALLIC IONS ON OIL DISPLACEMENT BY SURFACTANTS IN THE BURBANK SYSTEM

| Run No. | Initial | After Waterflood | After Surfactant | Surfactant Flood Composition by weight | Volume of Surfactant to breakthrough* (pore volumes) | Maximum Injection Pressure (p.s.i.) | Average Flow Rate, cc./hr. | Surfactant Required (grams) | Incremental Oil Recovery Percent Pore Volume | Incremental Oil Recovery Percent Residual | Surfactant Efficiency ml. Incremental Oil (grams of surfactant) |
|---|---|---|---|---|---|---|---|---|---|---|---|
| 1 | 73.3 | 26.7 | 8.0 | 1% Igepal CO-530 in synthetic brine. | 8.8 | 230 | 28 | 26 | 18.7 | 69.4 | 2.12 |
| 2 | 73.3 | 25.6 | 6.0 | ___do___ | 1.2 | 1,000 | 38 | 36 | 19.6 | 76.6 | 1.69 |
| 3 | 76.3 | 31.5 | 15.0 | 1% Igepal CO-530+ 5% CaCl₂ in synthetic brine. | 5.5 | 330 | 35 | 16 | 16.5 | 52.3 | 3.06 |
| 4 | 75.4 | 30.0 | 17.0 | 1% Igepal CO-530+ 5% CaCl₂+20% Ce(NO₃)₃ in synthetic brine. | 4.7 | 108 | 43 | 15 | 15.0 | 43.5 | 2.67 |

*Injection was terminated at surfactant breakthrough.

(1) They are all non-ionic polyethylene oxide ethers or thioethers.

(2) The maximum ethylene oxide chain length at the hydrophilic end is 4.5 to 6 moles, with a single terminal hydroxyl group.

(3) The effectiveness of the surfactant in this particular application depends upon the length of the ethylene oxide chain as well as the overall length of the molecule.

(4) The hydrophobic (oleophilic) portion of the molecule may be either straight chain or branched hydrocarbons which may also be linked to the ethylene oxide portion through a phenolic ring, including the octyl and nonylphenols.

The above data demonstrate that less surfactant and less water is needed when the ionic strength has been increased, although the displacement efficiency has been lowered. The overall cost per barrel of oil produced is less and the time for a complete sweep has been materially reduced. Also, additional oil can be produced by the injection of additional water into the stratum which has now adsorbed surfactant to provide in situ surfactant treatment of the water by reversing the equilibrium in the direction surfactant adsorbed → surfactant dissolved Certain modifications of the invention will become apparent to those skilled in the art and the illustrative de-

We claim:

1. A process for producing oil from an oil-bearing stratum penetrated by an injection well and a production well and containing connate water having a concentration of monovalent ions greater than 1000 p.p.m., which comprises the steps of:
   (a) injecting thru said injection well into said stratum a slug of fresh water relatively free of said ions to form a barrier thereof between connate water and the slug of step (b);
   (b) injecting as in step (a) a slug of an aqueous solution of non-ionic surfactant to form a bank thereof adjacent the barrier of step (a);
   (c) driving the slugs of steps (a) and (b) thru said stratum toward said production well by injecting a driving fluid thru said injection well so as to displace oil into said production well; and
   (d) recovering the oil from said production well.

2. The process of claim 1 further comprising the step of:
   (e) fortifying the slug of (b) prior to its entry into said stratum by incorporating therein a substantial concentration of multivalent ions.

3. The process of claim 2 wherein said ions comprise $Al^{+++}$.

4. The process of claim 2 wherein said ions comprise $Ce^{+++}$.

5. The process of claim 1 wherein the slugs of steps (a) and (b) are in the range of 0.1 to 1.0 pore volume and the surfactant concentration is in the range of 0.001 to 10 weight percent.

6. The process of claim 5 wherein the concentration of ions provided by step (e) is in the range of 0.25 to 1 molal.

7. The process of claim 1 wherein the surfactant of step (b) is nonylphenoxypoly(ethyleneoxy)ethanol.

8. A process for producing oil from an oil-bearing stratum penetrated by an injection well and a production well and containing connate water having a concentration of monovalent ions less than 1000 p.p.m., which comprises the steps of:
   (a) injecting thru said injection well into said stratum a slug of aqueous solution of a non-ionic surfactant fortified with an 0.25 to 1 molal concentration of at least one multivalent cation to form a liquid bank thereof in said stratum;
   (b) driving the liquid bank of step (a) thru said stratum toward said production well by injecting a driving fluid thru said injection well so as to displace oil into said production well; and
   (c) recovering the produced oil from said production well.

9. A process for producing oil from an oil-bearing stratum penetrated by an injection well and a production well and containing connate water having a concentration of monovalent ions less than 1000 p.p.m., which comprises the steps of:
   (a) injecting thru said injection well into said stratum a slug of aqueous solution containing an 0.25 to 1 molal concentration of at least one multivalent ion in an amount in the range of 0.1 to 1.0 pore volume;
   (b) injecting as in step (a) a slug of an aqueous solution of a non-ionic surfactant in a concentration in the range of 0.001 to 10 weight percent and in an amount in the range of 0.1 to 1.0 pore volume;
   (c) thereafter, forcing a driving fluid thru said stratum from said injection well toward said production well so as to displace oil into said production well; and
   (d) recovering the produced oil from said production well.

10. The process of claim 9 wherein said surfactant is nonylphenoxypoly(ethyleneoxy)ethanol and the driving fluid is aqueous.

11. The process of claim 10 wherein said ion comprises $Ca^{++}$.

12. The process of claim 10 wherein said ion comprises $Al^{+++}$.

13. The process of claim 10 wherein said ion comprises $Ce^{+++}$.

14. The process of claim 10 wherein said ion comprises an acid radical.

15. A process for producing oil from an oil-bearing stratum penetrated by an injection well and a production well and containing connate water having a concentration of monovalent ions less than 1000 p.p.m., which comprises the steps of:
   (a) injecting thru said injection well into said stratum a slug of aqueous solution containing an 0.25 to 1 molal concentration of at least one multivalent ion comprising $Al^{+++}$ in an amount in the range of 0.1 to 1.0 pore volumes;
   (b) injecting as in step (a) a slug of an aqueous solution of a non-ionic surfactant in a concentration in the range of 0.001 to 10 weight percent and in an amount in the range of 0.1 to 1.0 pore volume;
   (c) thereafter, forcing a driving fluid thru said stratum from said injection well toward said production well so as to displace oil into said production well; and
   (d) recovering the produced oil from said production well.

16. A process for producing oil from an oil-bearing stratum penetrated by an injection well and a production well and containing connate water having a concentration of monovalent ions less than 1000 p.p.m., which comprises the steps of:
   (a) injecting thru said injection well into said stratum a slug of aqueous solution containing a 0.25 to 1 molal concentration of at least one multivalent ion comprising $Ce^{+++}$ in an amount in the range of 0.1 to 1.0 pore volume;
   (b) injecting as in step (a) a slug of an aqueous solution of a non-ionic surfactant in a concentration in the range of 0.001 to 10 weight percent and in an amount in the range of 0.1 to 1.0 pore volume;
   (c) thereafter, forcing a driving fluid thru said stratum from said injection well toward said production well so as to displace oil into said production well; and
   (d) recovering the produced oil from said production well.

References Cited

UNITED STATES PATENTS

| | | | |
|---|---|---|---|
| 2,748,080 | 5/1956 | Newcombe et al. | 252—8.55 |
| 2,841,222 | 7/1958 | Smith | 252—8.55 |
| 2,882,973 | 4/1959 | Doscher et al. | 166—9 X |
| 3,056,452 | 10/1962 | Bernard et al. | 166—9 X |
| 3,087,539 | 4/1963 | Maverer et al. | 166—9 |
| 3,160,205 | 12/1964 | Harvey et al. | 166—9 |
| 3,175,610 | 3/1965 | Osoba | 166—9 |
| 3,208,528 | 9/1965 | Elliott et al. | 166—9 X |

OTHER REFERENCES

Catalogue, N.Y., Antara Chemicals, 1953, pp. 11 and 12.

CHARLES E. O'CONNELL, *Primary Examiner.*

IAN C. CALVERT, *Assistant Examiner.*